United States Patent [19]
Degnan et al.

[11] Patent Number: 5,536,894
[45] Date of Patent: *Jul. 16, 1996

[54] MCM-56 AS SORBENT AND CATALYST COMPONENT

[75] Inventors: Thomas F. Degnan, Moorestown, N.J.; Anthony S. Fung, Wilmingon, Del.; Terry E. Helton, Glen Mills, Pa.; Stephen L. Lawton, Pitman, N.J.; Daria N. Lissy, Glen Mills, Pa.; Wieslaw J. Roth, Sewell, N.J.

[73] Assignee: Mobil Oil Corporation, Fairfax, Va.

[ * ] Notice: The term of this patent shall not extend beyond the expiration date of Pat. No. 5,453,554.

[21] Appl. No.: 8,266,082

[22] Filed: Jun. 27, 1994

Related U.S. Application Data

[63] Continuation-in-part of Ser. No. 51,952, Apr. 26, 1993, Pat. No. 5,362,697.
[51] Int. Cl.$^6$ .............. C07C 2/66; C07C 2/56; C07C 4/02; C07C 7/12
[52] U.S. Cl. .......... 585/467; 585/613; 585/648; 585/709; 585/752; 585/820
[58] Field of Search .............. 585/467, 613, 585/648, 709, 722, 752, 820

[56] References Cited

U.S. PATENT DOCUMENTS

| | | | |
|---|---|---|---|
| 4,439,409 | 3/1984 | Puppe et al. | 423/328 |
| 4,826,667 | 5/1989 | Zones et al. | 423/277 |
| 4,954,325 | 9/1990 | Rubin et al. | 423/328 |
| 4,981,663 | 1/1991 | Rubin | 423/277 |
| 5,021,141 | 6/1991 | Rubin | 208/46 |
| 5,236,575 | 8/1993 | Bennett et al. | 208/46 |
| 5,334,795 | 8/1994 | Chu et al. | 585/467 |
| 5,371,310 | 12/1994 | Bennett et al. | 585/467 |
| 5,453,554 | 9/1995 | Cheng et al. | 585/467 |

FOREIGN PATENT DOCUMENTS

| | | |
|---|---|---|
| 0231860 | 1/1987 | European Pat. Off. . |
| 0293032 | 5/1988 | European Pat. Off. . |

*Primary Examiner*—Ponnathapura Achutamurthy
*Attorney, Agent, or Firm*—Dennis P. Santini

[57] ABSTRACT

This invention relates to use of synthetic layered material MCM-56 as a sorbent and as a catalyst component in catalytic conversion of organic compounds. Examples of sorbent use include rapid sorption of hydrocarbons and separating at least one hydrocarbon component from a mixture of hydrocarbon components having differential sorption characteristics with respect to MCM-56. Examples of catalytic use include acid catalyzed reactions, such as cracking, aromatic compound alkylation, and isoalkane alkylation.

40 Claims, 1 Drawing Sheet

MCM-56 AS SORBENT AND CATALYST COMPONENT

CROSS-REFERENCE TO RELATED APPLICATION

This is a continuation-in-part of application Ser. No. 08/051,952, filed Apr. 26, 1993, now U.S. Pat. No. 5,362,697.

BACKGROUND OF THE INVENTION

1. Field of the Invention

This invention relates to use of MCM-56, a composition of synthetic layered material, as a sorbent or catalyst component for conversion of organic compounds.

2. Description of the Prior Art

Porous inorganic solids have found utility as catalysts and separations media for industrial application. The openness of their microstructure allows molecules access to the relatively large surface areas of these materials that enhance their catalytic and sorptive activity. The porous materials in use today can be sorted into three broad categories using the details of their microstructure as a basis for classification. These categories are the amorphous and paracrystalline supports, the crystalline molecular sieves and modified layered materials. The detailed differences in the microstructures of these materials manifest themselves as important differences in the catalytic and sorptive behavior of the materials, as well as in differences in various observable properties used to characterize them, such as their surface area, the sizes of pores and the variability in those sizes, the presence or absence of X-ray diffraction patterns and the details in such patterns, and the appearance of the materials when their microstructure is studied by transmission electron microscopy and electron diffraction methods.

Amorphous and paracrystalline materials represent an important class of porous inorganic solids that have been used for many years in industrial applications. Typical examples of these materials are the amorphous silicas commonly used in catalyst formulations and the paracrystalline transitional aluminas used as solid acid catalysts and petroleum reforming catalyst supports. The term "amorphous" is used here to indicate a material with no long range order and can be somewhat misleading, since almost all materials are ordered to some degree, at least on the local scale. An alternate term that has been used to describe these materials is "X-ray indifferent". The microstructure of the silicas consists of 100–250 Angstrom particles of dense amorphous silica (*Kirk-Othmer Encyclopedia of Chemical Technology*, 3rd. ed., vol. 20, 766–781 (1982)), with the porosity resulting from voids between the particles. Since there is no long range order in these materials, the pores tend to be distributed over a rather large range. This lack of order also manifests itself in the X-ray diffraction pattern, which is usually featureless.

Paracrystalline materials such as the transitional aluminas also have a wide distribution of pore sizes, but better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No 19 Revised, Alcoa Research Laboratories, 54–59 (1987)). Since, in the case of either material, there is no long range order controlling the sizes of pores in the material, the variability in pore size is typically quite high. The sizes of pores in these materials fall into a regime called the mesoporous range,, including, for example, pores within the range of about 15 to about 200 Angstroms.

In sharp contrast to these structurally ill-defined solids are materials whose pore size distribution is very narrow because it is controlled by the precisely repeating crystalline nature of the materials' microstructure. These materials are called "molecular sieves" the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials are known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIB element oxide, e.g., $AlO_4$, in which the tetrahedra are cross-linked by the sharing of oxygen atoms whereby the ratio of the total Group IIIB element, e.g., aluminum, and Group IVB element, e.g., silicon, atoms to oxygen atoms is 1:2. The electrovalence of the tetrahedra containing the Group IIIB element, e.g., aluminum, is balanced by the inclusion in the crystal of a cation, for example, an alkali metal or an alkaline earth metal cation. This can be expressed wherein the ratio of the Group IIIB element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolites A (U.S. Pat. No. 2,882,243); X (U.S. Pat. No. 2,882,244); Y (U.S. Pat. No. 3,130,007); ZK-5 (U.S. Pat. No. 3,247,195); ZK-4 (U.S. Pat. No. 3,314,752); ZSM-5 (U.S. Pat. No. 3,702,886); ZSM-11 (U.S. Pat. No. 3,709,979); ZSM-12 (U.S. Pat. No. 3,832,449), ZSM-20 (U.S. Pat. No. 3,972,983); ZSM-35 (U.S. Pat. No. 4,016,245); ZSM-23 (U.S. Pat. No. 4,076,842); MCM-22 (U.S. Pat. No. 4,954,325); MCM-35 (U.S. Pat. No. 4,981,663); MCM-49 (U.S. Pat. No. 5,236,575); and PSH-3 (U.S. Pat. No. 4,439,409), merely to name a few.

U.S. Pat. No. 4,439,409 refers to a crystalline molecular sieve composition of matter named PSH-3 and its synthesis from a reaction mixture containing hexamethyleneimine, an organic compound which acts as directing agent for synthesis of the present layered MCM-56. A composition of matter appearing to be identical to the PSH-3 of U.S. Pat. No. 4,439,409, but with additional structural components, is taught in European Patent Application 293,032. Hexamethyleneimine is also taught for use in synthesis of crystalline molecular sieves MCM-22 in U.S. Pat. 4,954,325; MCM-35 in U.S. Pat. No. 4,981,663; MCM-49 in U.S. Pat. 5,236,575; and ZSM-12 in U.S. Pat. No. 5,021,141. A molecular sieve composition of matter referred to as zeolite SSZ-25 is taught in U.S. Pat. No. 4,826,667 and European Patent Application 231,860, said zeolite being synthesized from a reaction mixture containing an adamantane quaternary ammonium ion.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Catalytic cracking is a hydrocarbon conversion process which may utilize certain of the above materials as catalyst components. Such a process is commercially employed in the petroleum refining industry to produce useful products, such as high quality gasoline and fuel oils, from hydrocarbon-containing feeds. The endothermic catalytic cracking of hydrocarbons is most commonly practiced in accordance with two known catalytic cracking operations, namely, fluid catalytic cracking (FCC) and moving bed catalytic cracking.

Generally, both fluid catalytic cracking and moving bed operations are commercially practiced in a cyclic mode. During these operations, the hydrocarbon feedstock is contacted with hot, active, solid particulate catalyst without added hydrogen, for example, at pressures of up to about 50 psig and temperatures up to about 650° C. As the hydrocarbon feed is cracked in the presence of cracking catalyst to form more valuable and desirable products, undesirable carbonaceous residue known as "coke" is deposited on the catalyst. The spent catalyst contains coke as well as metals that are present in the feedstock.

Current worldwide refinery trends indicate a continuing need to process heavier feed stock. As a result, many refineries will be processing feedstock containing resids or deeper cut gas oils which have high metals contents. The enhancement of octane produced in catalytic cracking operations is an important goal in the preparation of zeolite containing catalysts. The environmental regulations in the United States and abroad, and the phaseout of lead additives for gasolines in both the U.S. and abroad, provide a strong incentive for refineries to use catalysts which produce increased octane gasolines from heavier metals contaminated feedstock.

U.S. Pat. No. 5,110,776 teaches a method for preparing FCC catalyst comprising modifying the zeolite, e.g., ZSM-5, with phosphorus. U.S. Pat. No. 5,126,298 teaches manufacture of an FCC catalyst comprising zeolite, e.g., ZSM-5, clay, and phosphorus. Phosphorus treatment has been used on faujasite-based cracking catalysts for metals passivation (see U.S. Pat. Nos. 4,970,183 and 4,430,199); reducing coke make (see U.S. Pat. Nos. 4,567,152; 4,584,091; and 5,082, 815); increasing activity (see U.S. Pat. Nos. 4,454,241 and 4,498,975); increasing gasoline selectivity (See U.S. Pat. No. 4,970,183); and increasing steam stability (see U.S. Pat. Nos. 4,765,884 and 4,873,211).

In U.S. Pat. No. 3,758,403, use of large-pore cracking catalyst with large amounts of ZSM-5 additive gives only modest increase in light olefin production. A 100% increase in ZSM-5 content (from 5 wt. % ZSM-5 to 10 wt. % ZSM-5) increased the propylene yield less than 20%, and decreased slightly the potential gasoline yield ($C_5$+gasoline plus alkylate).

U.S. Pat. No. 4,309,280 teaches adding very small amounts of powdered, neat ZSM-5 catalyst, characterized by a particle size below 5 microns. Adding as little as 0.25 wt. % ZSM-5 powder to the FCC catalyst inventory increased LPG production 50%. Small amounts of neat powder behaved much like larger amounts of ZSM-5 disposed in larger particles.

A way to add a modest amount of ZSM-5 to an FCC unit is disclosed in U.S. Pat. No. 4,994,424, incorporated herein by reference. ZSM-5 additive is added to the equilibrium catalyst in a programmed manner so an immediate boost in octane number, typically ½–2 octane number, is achieved.

U.S. Pat. No. 4,927,523, incorporated herein by reference, teaches a way to add large amounts of ZSM-5 to a unit without exceeding wet gas compressor limits. Large amounts are added and cracking severity is reduced in the FCC unit for several days.

It is an object of the present invention to provide an organic compound feedstock conversion process using a new catalyst for manufacture of useful products.

It is a further object of the invention to provide a process using a new catalyst composition to impart an octane-enhancing property in a catalytic cracking process, and to enhance production of light olefins, e.g., propylene and butylene, in said process.

It is also an object of the present invention to provide a method for selectively separating components in a mixture with a new sorbent composition.

SUMMARY OF THE INVENTION

The present invention is directed to use of a novel layered composition of matter, named MCM-56, as a sorbent, and for conversion of organic compounds contacted with an active form thereof. The MCM-56 for use in this invention exhibits certain similarities with crystalline framework materials, e.g., MCM-22 and MCM-49, and with certain other layered materials. To synthesize MCM-56, the reaction is stopped and quenched prior to a time when another material, i.e., MCM-49, forms in the reaction mixture. MCM-56 has an average unit cell c-parameter of about 25.5 Angstroms without interlayer bridges having been formed. When as-synthesized MCM-56 is calcined at, for example, 540° C., the structure does not condense but remains in layered form. Calcined MCM-56 adsorbs at least about 35 μl/g of 1,3,5-trimethylbenzene, e.g., at least about 4 times as much 1,3,5-trimethylbenzene as calcined MCM-22 or MCM-49. Sorption data also distinguishes calcined MCM-56 from calcined MCM-22 and MCM-49 by its initial rapid uptake of 2,2-dimethylbutane. MCM-56 exhibits unique sorption and catalytic utilities when compared to MCM-22 and MCM-49.

U.S. application Ser. No. 08/051,952, U.S. Pat. No. 5,362,697 is entirely incorporated herein by reference for definition of MCM-56 and its properties.

DESCRIPTION OF SPECIFIC EMBODIMENTS

Figure 1A:
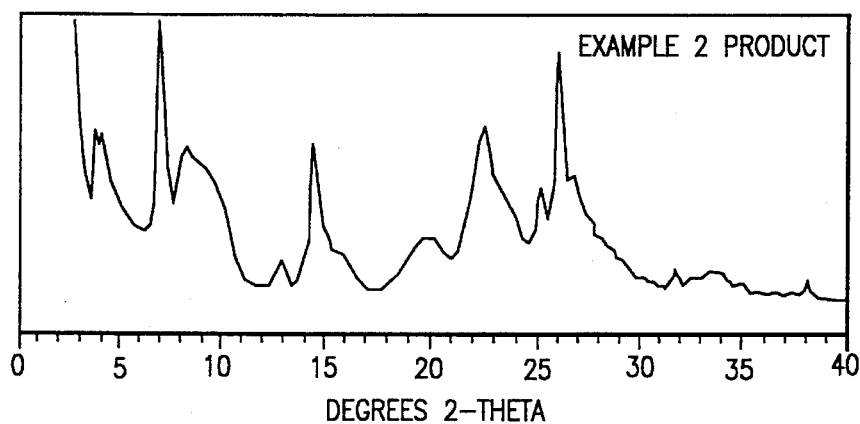
FIG. 1(a) shows the X-ray diffraction pattern of the Example 2 product.

The unique layered material MCM-56 for use in this invention has a composition involving the molar relationship:

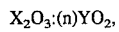

wherein X is a trivalent element, such as aluminum, boron, iron and/or gallium, preferably aluminum; Y is a tetravalent element such as silicon and/or germanium, preferably silicon; and n is less than about 35, e.g., from about 5 to less than about 25, usually from about 10 to less than about 20, more usually from about 13 to about 18. In the as-synthesized form, the material has a formula, on an anhydrous basis and in terms of moles of oxides per n moles of $YO_2$, as follows:

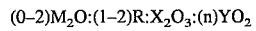

wherein M is an alkali or alkaline earth metal, and R is an organic moiety. The M and R components are associated with the material as a result of their presence during synthesis, and are easily removed by post-synthesis methods hereinafter more particularly described.

The MCM-56 material for use herein may be thermally treated and in the calcined form exhibits high surface area (greater than 300 m²/gm) and unusually large sorption capacity for certain large molecules when compared to previously described materials such as calcined PSH-3, SSZ-25, MCM-22, and MCM-49. The MCM-56 wet cake, i.e., as-synthesized MCM-56, is swellable indicating the absence of interlayer bridges, in contrast with MCM-49 which is unswellable.

To the extent desired, the original alkali or alkaline earth, e.g., sodium, cations of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which tailor the catalytic activity for certain hydrocarbon conversion reactions. These include hydrogen, rare earth metals and metals of Groups IIA, IIIA, IVA, IB, IIB, IIIB, IVB and VIII of the Periodic Table of the Elements.

The MCM-56 material for use herein appears to be essentially pure with little or no detectable impurity crystal or layer phases and has an X-ray diffraction pattern which is distinguished by the combination of line positions and intensities from the patterns of other known as-synthesized or thermally treated materials as shown below in Table I (as synthesized) and Table II (calcined). In these tables, intensities are defined relative to the d-spacing line at 12.4 Angstroms.

TABLE I

| MCM-56 | | Closest Relative Layered Material | | Closest Relative 3-Dimensional Material MCM-49 | |
|---|---|---|---|---|---|
| Interplanar d-Spacing (A) | Relative Intensity | Interplanar d-Spacing (A) | Relative Intensity | Interplanar d-spacing (A) | Relative Intensity |
| — | — | 13.5 | m | — | — |
| 12.4 ± 0.2 | vs | 12.4 | m–vs | 12.5 | vs |
| — | — | 11.1 | m | 11.2 | m–s |
| 9.9 ± 0.3 | m | — | — | — | — |
| — | — | 9.2 | m | 9.0 | m |
| 6.9 ± 0.1 | w | 6.9 | w | 6.9 | w |
| 6.4 ± 0.3 | w | 6.7 | w | 6.4 | w |
| 6.2 ± 0.1 | w | 6.2 | w | 6.2 | m |
| 3.57 ± 0.07 | m–s | 3.56 | w–m | 3.55 | w–m |
| 3.44 ± 0.07 | vs | 3.43 | s–vs | 3.44 | vs |

TABLE II

| MCM-56 | | MCM-22 | | MCM-49 | |
|---|---|---|---|---|---|
| Interplanar d-Spacing (A) | Relative Intensity | Interplanar d-Spacing (A) | Relative Intensity | Interplanar d-spacing (A) | Relative Intensity |
| 12.4 ± 0.2 | vs | 12.4 | m–vs | 12.4 | vs |
| — | — | 11.0 | m–s | 11.1 | s |
| 9.9 ± 0.3 | m–s | — | — | — | — |
| — | — | 8.8 | m–vs | 8.9 | m–s |
| 6.9 ± 0.1 | w | 6.9 | w–m | 6.9 | w |
| 6.2 ± 0.1 | s | 6.2 | m–vs | 6.2 | m |
| 3.55 ± 0.07 | m–s | 3.56 | w–m | 3.57 | w |
| 3.42 ± 0.07 | vs | 3.42 | vs | 3.43 | s–vs |

The materials used for generation of the data in Table I were wet cake layered MCM-56, wet cake layered material synthesized with the same organic directing agent which, when calcined, transforms into MCM-22, and wet cake crystalline MCM-49. The materials used for the data in Table II were the calcined materials used for Table I. Calcination of each material was in air at 540° C. for 2–20 hours. The most effective diagnostic feature allowing the initial differentiation between MCM-56 and the other members of this family (MCM-22 and MCM-49-type materials) is observed in the region of 8.8–11.2 Angstroms d-spacing. The latter species exhibit two resolved maxima at approximately 8.8–9.2 Angstroms and 10.8–11.2 Angstroms with a distinct depression between them. MCM-56 is characterized by a broad band centered around d-spacing 9.9 Angstroms. While the band may have asymmetric profile, for example with an inflection point, the emergence of a depression may be indicative of the onset of MCM-49 formation and the loss of MCM-56.

These X-ray diffraction data were collected with a Scintag diffraction system, equipped with a germanium solid state detector, using copper K-alpha radiation. The diffraction data were recorded by step-scanning at 0.02 degrees of two-theta, where theta is the Bragg angle, and a counting time of 10 seconds for each step. The interplanar spacings, d's, were calculated in Angstrom units (A), and the relative intensities of the lines, $I/I_o$ is one-hundredth of the intensity of the strongest line, above background, were derived with the use of a profile fitting routine (second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, and thermal and/or hydrothermal history. Other changes in diffraction patterns can be indicative of important differences between materials, which is the case for comparing MCM-56 with similar materials, e.g., MCM-49, MCM-22, and PSH-3.

The significance of differences in the X-ray diffraction patterns of these materials can be explained from a knowledge of the structures of the materials. MCM-22 and PSH-3 are members of an unusual family of materials because, upon calcination, there are changes in the X-ray diffraction pattern that can be explained by a significant change in one axial dimension. This is indicative of a profound change in the bonding within the materials and not a simple loss of the organic material. The precursor members of this family can be clearly distinguished by X-ray diffraction from the calcined members (e.g., compare middle columns of Tables I and II). An examination of the X-ray diffraction patterns of both precursor and calcined forms shows a number of reflections with very similar position and intensity, while other peaks are different. Some of these differences are directly related to the changes in the axial dimension and bonding.

Crystalline MCM-49 has an axial dimension similar to those of the calcined members of the family and, hence, there are similarities in their X-ray diffraction patterns. Nevertheless, the MCM-49 axial dimension is different from that observed in the calcined materials. For example, the changes in axial dimensions in MCM-22 can be determined from the positions of peaks particularly sensitive to these changes. Two such peaks occur at ~13.5 Angstroms and ~6.75 Angstroms in precursor MCM-22, at ~12.8 Angstroms and ~6.4 Angstroms in as-synthesized MCM-49, and at ~12.6 Angstroms and ~6.30 Angstroms in the calcined MCM-22. The ~12.8 Angstroms peak in MCM-49, is very close to the intense ~12.4 Angstroms peak observed for all three materials, and is frequently not fully separated from it. Likewise, the ~12.6 Angstroms peak of the calcined MCM-22 material is usually only visible as a shoulder on the intense ~12.4 Angstroms peak.

Other features which collectively distinguish MCM-56 from the similar materials described above are summarized in Table III below.

TABLE III

| Feature | MCM-22 | MCM-49 | MCM-56 |
| --- | --- | --- | --- |
| As-synthesized: | | | |
| Structure | layered | 3-dimensional | layered |
| Swellable | yes | no | yes |
| Condenses upon Calcination | yes | yes | no |
| Calcined: | | | |
| Sorption capacity for 1,3 5-tri-methyl benzene[1] | low | low | high |
| Initial uptake of 2,2-di-methylbutane[2] | slow | slow | fast |

[1]Low sorption capacity is defined as less than about 8 to 10 μl/g. High capacity is at least about 4 times the low capacity. Calcined MCM-56 sorbs at least about 35 μl/g.
[2]Initial uptake is defined as time to adsorb the first 15 mg of 2,2-dimethylbutane/gram of sorbent. Fast uptake is less than 20 seconds; slow uptake is at least 5 times the fast value. One gram of calcined MCM-56 sorbs 15 mg of 2,2-dimethylbutane in less than about 20 seconds, e.g., less than about 15 seconds.

When used as a catalyst, the layered MCM-56 material may be subjected to treatment to remove part or all of any organic constituent. The material can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of co-crystallization, exchanged into the composition to the extent a Group IIIA element, e.g., aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds far this purpose include chloroplatinic acid, platinous chloride and various compounds containing the platinum amine complex.

MCM-56 may be thermally treated without affecting its layered structure in that it is still swellable after thermal treatment. Thermal treatment is generally performed by heating at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions. Non-limiting examples of such reactions include those described in U.S. Pat. Nos. 4,954,325; 4,973,784; 4,992,611; 4,956,514; 4,962,250; 4,982,033; 4,962,257; 4,962,256; 4,992,606; 4,954,663; 4,992,615; 4,983,276; 4,982,040; 4,962,239; 4,968,402; 5,000,839; 5,001,296; 4,986,894; 5,001,295; 5,001,283; 5,012,033; 5,019,670; 5,019,665; 5,019,664; and 5,013,422, each incorporated herein by reference as to the description of said catalytic reactions.

The layered MCM-56 material, when employed either as an adsorbent or as a catalyst in an organic compound conversion process, should be dehydrated, at least partially. This can be done by heating to a temperature in the range of 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the MCM-56 in a vacuum, but a longer time is required to obtain a sufficient amount of dehydration.

MCM-56 can be prepared from a reaction mixture containing sources of alkali or alkaline earth metal (M), e.g., sodium or potassium, cation, an oxide of trivalent element X, e.g., aluminum, an oxide of tetravalent element Y, e.g., silicon, directing agent (R), and water, said reaction mixture having a composition, in terms of mole ratios of oxides, within the following ranges:

| Reactants | Useful | Preferred |
|---|---|---|
| $YO_2/X_2O_3$ | 5 to 35 | 10 to 25 |
| $H_2O/YO_2$ | 10 to 70 | 16 to 40 |
| $OH^-/YO_2$ | 0.05 to 0.5 | 0.06 to 0.3 |
| $M/YO_2$ | 0.05 to 3.0 | 0.06 to 1.0 |
| $R/YO_2$ | 0.1 to 1.0 | 0.3 to 0.5 |

In the present synthesis method, the source of $YO_2$ should be comprised predominately of solid $YO_2$, for example at least about 30 wt. % solid $YO_2$ in order to obtain the crystal product of the invention. Where $YO_2$ is silica, the use of a silica source containing at least about 30 wt. % solid silica, e.g., Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors crystalline MCM-56 formation from the above mixture under the synthesis conditions required. Preferably, therefore, the $YO_2$, e.g., silica, source contains at least about 30 wt. % solid $YO_2$, e.g., silica, and more preferably at least about 40 wt. % solid $YO_2$, e.g., silica.

Directing agent R is selected from the group consisting of cycloalkylamine, azacycloalkane, diazacycloalkane, and mixtures thereof, alkyl comprising from 5 to 8 carbon atoms. Non-limiting examples of R include cyclopentylamine, cyclohexylamine, cycloheptylamine, hexamethyleneimine, heptamethyleneimine, homopiperazine, and combinations thereof.

Crystallization of the present layered material can be carried out at either static or stirred conditions in a suitable reactor vessel, such as for example, polypropylene jars or teflon lined or stainless steel autoclaves. The total useful range of temperatures for crystallization is from about 80° C. to about 225° C. It is critical, however, for synthesis of MCM-56 from the above reaction mixture to stop and quench the reaction prior to the onset of MCM-49 formation at the expense of MCM-56. Thereafter, the MCM-56 is separated from the liquid and recovered.

It should be realized that the reaction mixture components can be supplied by more than one source. The reaction mixture can be prepared either batchwise or continuously.

MCM-56 prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, MCM-56 can be extruded before drying or partially dried and then extruded.

The layered MCM-56 material of this invention may be used as an adsorbent, such as for separating at least one component from a mixture of components in the vapor or liquid phase having differential sorption characteristics with respect to MCM-56. Therefore, at least one component can be partially or substantially totally separated from a mixture of components having differential sorption characteristics with respect to MCM-56 by contacting the mixture with the MCM-56 to selectively sorb the one component.

The layered MCM-56 material of this invention can be used to catalyze a wide variety of chemical conversion processes including many of present commercial/industrial importance. Conversion conditions, in general, include a temperature of from about −25° C. to about 650° C., a pressure of from about atmospheric to about 5,000 psig, and a weight hourly space velocity of from about 0.01 to about 2,000 $hr^{-1}$. Conversion conditions, in general, for cracking include a temperature of from about 400° C. to about 650° C. and a pressure of from about atmospheric to about 5 atmospheres. Examples of chemical conversion processes which are effectively catalyzed by MCM-56, by itself or in combination with one or more other catalytically active substances including other crystalline catalysts, include those requiring a catalyst with acid activity. Specific examples include:

(1) alkylation of aromatic hydrocarbons, e.g., benzene, with long chain olefins of six or more carbon atoms, e.g., $C_6$–$C_{14}$ olefin, with reaction conditions including a temperature of from about 340° C. to about 500° C., a pressure of from about atmospheric to about 200 atmospheres, a weight hourly space velocity of from about 2 $hr^{-1}$ to about 2000 $hr^{-1}$ and an aromatic hydrocarbon/olefin mole ratio of from about 1/1 to about 20/1, to provide long chain alkyl aromatics which can be subsequently sulfonated to provide synthetic detergents;

(2) alkylation of aromatic hydrocarbons with gaseous olefins to provide short chain alkyl (e.g., $C_2$–$C_5$) aromatic compounds, e.g., the alkylation of benzene with propylene to provide cumene, with reaction conditions including a temperature of from about 10° C. to about 125° C., a pressure of from about 1 to about 30 atmospheres, and an aromatic hydrocarbon weight hourly space velocity (WHSV) of from 5 $hr^{-1}$ to about 50 $hr^{-1}$;

(3) alkylation of reformate containing substantial quantities of benzene and toluene with fuel gas containing $C_5$ olefins to provide, inter alia, mono- and dialkylates with reaction conditions including a temperature of from about 315° C. to about 455° C., a pressure of from about 400 to about 800 psig, a WHSV-olefin of from about 0.4 $hr^{-1}$ to about 0.8 $hr^{-1}$, a WHSV-reformate of from about 1 $hr^{-1}$ to about 2 $hr^{-1}$ and a gas recycle of from about 1.5 to 2.5 vol/vol fuel gas feed;

(4) alkylation of aromatic hydrocarbons, e.g., benzene, toluene, xylene and naphthalene, with long chain olefins of six or more carbon atoms, e.g., $C_6$–$C_{14}$ olefin, to provide alkylated aromatic lube base stocks with reaction conditions including a temperature of from about 160° C. to about 260° C. and a pressure of from about 350 to 450 psig;

(5) alkylation of phenols with an alkylation agent selected from the group consisting of long chain, e.g., $C_6$–$C_{14}$, olefins or equivalent alcohols to provide long chain alkyl phenols with reaction conditions including a temperature of from about 200° C. to about 250° C., a pressure of from about 200 to 300 psig and a total WHSV of from about 2 $hr^{-1}$ to about 10 $hr^{-1}$; and (6) alkylation of isoalkanes, e.g., isobutane, with olefins, e.g., 2-butene, with reaction conditions including a temperature of from about −25° C. to about 400° C., e.g., from 75° C. to 200° C., a pressure of from below atmospheric: to about 35000 kPa (5000 psig), e.g., from 100 to 7000 kPa (1 to 1000 psig), a weight hourly space velocity based on olefin of from about 0.01 hr$^{-1}$ to about 100 hr$^{-1}$, e.g., from 0.1 hr$^{-1}$ to 20 hr$^{-1}$, and a mole ratio of total isoalkane to total olefin of from about 1:2 to about 100:1, e.g., from 3:1 to 30:1.

In catalytic cracking over catalyst comprising MCM-56, high molecular weight hydrocarbons are converted to lower molecular weight hydrocarbons of suitable volatility to permit their use as liquid fuels. The combustion characteristics of gasoline are assessed empirically by assigning the fuel an octane rating. This is generally defined as a comparison with a primary reference which is the percentage of iso-octane (2,2,4-trimethylpentane) in an n-heptane/iso-octane mixture to which the gasoline under examination is equivalent in terms of combustion behavior when considering the octane ratings of n-heptane and iso-octane to be zero and 100 respectively. Both RON and MON can be tested on the same single-cylinder, four-stroke engine of standardized design. RON signifies the research octane number, MON signifies the motor octane number, and the terms are used to describe the knocking characteristics of gasoline, that is, its combustion behavior. For a measurement of RON, the engine speed used is 600 rpm which yields results comparable to an automobile engine operated at low speed. For a measurement of MON, the engine speed is 900 rpm which approximates higher speed cruising conditions. Generally, higher octane numbers are found by the research method compared to the motor method for the same gasoline sample. The average of the RON and MON, known as the road octane number, gives an indication of typical performance in an engine. The higher the octane, the better the combustion behavior in a spark-ignition engine. It has been found that road octane number correlates much more closely to the motor octane number than the research octane. Generally, aromatics and branched paraffinic and olefinic hydrocarbons have higher octane values than acyclic or linear paraffinic hydrocarbons.

In conjunction with catalytic cracking to produce gasoline product, alkylate and potential alkylate may result from the cracking process. This indirectly leads to product of increased octane because high octane, highly branched paraffinic gasoline blending stocks are produced principally by alkylation of $C_3$ and $C_4$ olefins with isobutane. Unlike cracking, alkylation makes larger branched hydrocarbons from smaller hydrocarbons and these larger branched hydrocarbons are inherently higher in octane.

The present process provides not only a high octane product, but significantly more light olefins, especially propylene and butylene. The lower olefins of this product are high quality, petrochemical grade, and may be used for manufacture of valuable ethers and/or alcohols, or as alkylating agents.

The feedstock for a cracking process using MCM-56 catalyst, that is, the hydrocarbons to be cracked, may include in whole or in part, a gas oil (e.g., light, medium, or heavy gas oil) having an initial boiling point above about 204° C., a 50% point of at least about 260° C., and an end point of at least about 315° C. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like.

As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils having an end point of up to about 700° C., even with high metals contents, can also be cracked using the invention.

The present invention provides a process for converting feedstock hydrocarbon compounds to product hydrocarbon compounds of lower molecular weight than the feedstock hydrocarbon compounds. In particular, the present invention provides a process for catalytically cracking a hydrocarbon feed to a mixture of products comprising gasoline, alkylate, potential alkylate, and lower olefins, e.g., propylene, in the presence of a cracking catalyst under catalytic cracking conditions. Catalytic cracking units which are amenable to the process of the invention operate at temperatures from about 400° C. to about 650° C., usually from about 450° C. to about 600° C., and under reduced, atmospheric, or superatmospheric pressure, usually from about atmospheric to about 5 atmospheres. The catalytic process can be either fixed bed, moving bed, transfer line, or fluidized bed, and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typically preferred TCC conversion conditions include an average reactor temperature of from about 450° C. to about 540° C.; catalyst/oil volume ratio of from about 2 to about 7; reactor volume hourly space velocity of from about 1 to about 5 vol./hr./vol.; and recycle to fresh feed ratio of from 0 to about 0.5 (volume).

The process of the invention is particularly applicable to Fluid Catalytic Cracking. In fluidized catalytic cracking processes, the catalyst is a fine powder of about 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high pressure receiver. Gas from this receiver is routed to the primary absorber, where it is contacted by the unstabilized gasoline from the main-column overhead receiver. The net effect of this contacting is a separation between $C_3+$ and $C_2-$ fractions in the feed to the primary absorber. Primary absorber off-gas is directed to a secondary or sponge absorber, where a circulating stream of light cycle oil from the main column is used to absorb most of the remaining $C_5+$ material in the sponge absorber feed. Some $C_3$ and $C_4$ materials are also absorbed. The sponge-absorber rich oil is returned to the FCC main column. The sponge-absorber overhead, with most of the valuable $C_4+$ material removed but including $H_2S$, is sent to the fuel gas or other process streams.

Liquid from the high pressure separator is sent to a stripper where most of the $C_2-$ is removed overhead and sent back to the high pressure separator. The bottoms liquid from the stripper is sent to the debutanizer, where an olefinic $C_3-C_4$ product is further separated for gasoline production. The debutanizer bottoms, that is, the stabilized gasoline, is sent to treating, if necessary, and then to storage. The $C_3$ and $C_4$ product olefins can be directed to an alkylation unit to produce a high octane gasoline by the reaction of an iso-paraffin (usually iso-butane) with one or more of the low molecular weight olefins (usually propylene and butylene).

The FCC conversion conditions include a riser top temperature of from about 500° C. to about 595° C., preferably from about 520° C. to about 565° C., and most preferably from about 530° C. to about 550° C.; catalyst/oil weight ratio of from about 3 to about 12, preferably from about 4 to about 11, and most preferably from about 5 to about 10; and catalyst residence time of from about 0.5 to about 15 seconds, preferably from about 1 to about 10 seconds.

In the FCC process, the MCM-56 component may be combined with a large-pore molecular sieve component which may comprise any active component having cracking activity and which has a pore opening of greater than about 7 Angstroms in effective diameter. The active component may be a conventional large-pore molecular sieve including zeolite X (U.S. Pat. No. 2,882,442); REX; zeolite Y (U.S. Pat. No. 3,130,007); Ultrastable Y (USY) (U.S. Pat. No. 3,449,070); Rare Earth exchanged Y (REY) (U.S. Pat. No. 4,415,438); Rare Earth exchanged USY (REUSY); Dealuminated Y (DeAl Y) (U.S. Pat. Nos. 3,442,792 and 4,331,694); Ultrahydrophobic Y (UHPY) (U.S. Pat. No. 4,401,556); and/or dealuminated silicon-enriched zeolites, e.g., LZ-210 (U.S. Pat. No. 4,678,765). Preferred are higher silica forms of zeolite Y. ZSM-20 (U.S. Pat. No. 3,972,983); zeolite Beta (U.S. Pat. No. 3,308,069); zeolite L (U.S. Pat. Nos. 3,216,789 and 4,701,315); and naturally occurring zeolites such as faujasite, mordenite and the like may also be used. These materials may be subjected to conventional treatments, such as impregnation or ion exchange with rare earths to increase stability. These patents are incorporated herein by reference. In current commercial practice most cracking catalysts contain these large-pore molecular sieves. The preferred molecular sieve of those listed above is a zeolite Y, more preferably an REY, USY or REUSY.

Other large-pore crystalline molecular sieves include pillared silicates and/or clays; aluminophosphates, e.g., $ALPO_4$-5, $ALPO_4$-8, VPI-5; silicoaluminophosphates, e.g., SAPO-5, SAPO-37, SAPO-40, MCM-9; and other metal aluminophosphates. Mesoporous crystalline material for use as the molecular sieve includes MCM-41. These are variously described in U.S. Pat. Nos. 4,310,440; 4,440,871; 4,554,143; 4,567,029; 4,666,875; 4,742,033; 4,880,611; 4,859,314; 4,791,083; 5,102,643; and 5,098,684, each incorporated herein by reference.

The MCM-56 and/or large-pore molecular sieve catalyst component may include phosphorus or a phosphorus compound for any of the functions generally attributed thereto, such as, for example, attrition resistance, stability, metals passivation, and coke make reduction.

To prepare the large-pore molecular sieve component for use herein, a slurry may be formed by deagglomerating the molecular sieve, preferably in an aqueous solution. A slurry of the matrix material may be formed by mixing the desired matrix components such as clay and/or inorganic oxide in an aqueous solution. The molecular sieve slurry and the matrix slurry are then well mixed and spray dried to form catalyst particles of, for example, less than 200 microns in diameter.

It is conventional to use an additive catalyst with different properties along with a conventional catalyst to form an optional mixed catalyst system. We now find that MCM-56 may be used as an additive catalyst for this purpose. Commercially used additives are shape-selective zeolites. Zeolites having a Constraint Index of 1–12 have been used for this purpose. Details of the Constraint Index test are provided in *J. Catalysis*, 67, 218–222 (1981) and in U.S. Pat. No. 4,711,710 both of which are incorporated herein by reference.

Conventional shape-selective zeolites useful for this purpose are exemplified by large pore (e.g., greater than about 7 Angstroms pore size) zeolite Beta (U.S. Pat. No. 3,308,069); intermediate pore (e.g., pore size of from about 4 to about 7 Angstroms) zeolites ZSM-5 (U.S. Pat. No. 3,702,886 and Re. 29,948); ZSM-11 (U.S. Pat. No. 3,709,979); ZSM-12 (U.S. Pat. No. 4,832,449); ZSM-22 (U.S. Pat. No. 4,556,477); ZSM-23 (U.S. Pat. No. 4,076,842); ZSM-35 (U.S. Pat. No. 4,016,245); ZSM-48 (U.S. Pat. No. 4,397,827); ZSM-57 (U.S. Pat. No. 4,046,685); PSH-3 (U.S. Pat. No. 4,439,409); and MCM-22 (U.S. Pat. No. 4,954,325); and small pore (e.g., having pore openings of less than about 4 Angstroms diameter) zeolites ZSM-34 and erionite, either alone or in combination. In addition, the catalyst composition may include metals useful in promoting the oxidation of carbon monoxide to carbon dioxide under regenerator conditions as described in U.S. Pat. No. 4,350,614. The additive catalyst may also include phosphorus or a phosphorus compound for any of the functions generally attributed thereto.

The large-pore molecular sieve component of catalyst for use herein may comprise from about 5 to about 60 weight percent of the catalyst composition. The additive catalyst component, i.e., MCM-56 catalyst, may comprise from about 0.5 to about 50, for example, from about 2 to about 50, weight percent of the catalyst composition. For the additive catalyst, the MCM-56 may comprise from at least about 25 to less than about 60 weight percent of the additive catalyst component composition.

Although neither the cracking catalyst nor the additive catalyst need be steamed prior to use in the present process, they may be steamed at a temperature of from about 300° C. to about 800° C. for a time of from about 1 to about 200 hours in about 5 to about 100% steam.

In an embodiment of the present invention, the catalyst composition may include metals useful in promoting the oxidation of carbon monoxide to carbon dioxide under catalyst regeneration conditions as described in U.S. Pat.

Nos 4,072,600 and 4,350,614, the entire contents of each incorporated herein by reference. Examples of this embodiment include addition to the catalyst composition for use herein trace amounts of oxidation promoter selected from the group consisting of platinum, palladium, iridium, osmium, rhodium, ruthenium, rhenium, and combination thereof. The catalyst composition may comprise, for example, from about 0.01 ppm to about 100 ppm by weight oxidation promoter, usually from about 0.01 ppm to about 50 ppm by weight, preferably from about 0.01 ppm to about 5 ppm by weight.

In the case of many catalysts, it is desired to incorporate MCM-56 with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the MCM-56, i.e., combined therewith or present during synthesis of MCM-56, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present MCM-56 layered material also include inorganic oxides, notably alumina.

In addition to the foregoing materials, the MCM-56 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of finely divided MCM-56 material and inorganic oxide matrix vary widely, with the MCM-56 content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLE 1

A mixture of 258 grams of water, 6 grams of 50% sodium hydroxide solution, 13.4 grams of sodium aluminate solution (25.5% $Al_2O_3$ and 19.5% $Na_2O$), 51.4 grams of Ultrasil (VN3), and 27.1 grams of hexamethyleneimine (HMI) was reacted in a 600 ml stirred (400 rpm) autoclave at 143° C.

The reaction mixture had the following composition in mole ratios:

$SiO_2/Al_2O_3$=23

$OH^-/SiO_2$=0.21

$Na/SiO_2$=0.21

$HMI/SiO_2$=0.35

$H_2O/SiO_2$=20

The reaction was stopped at 34 hours. The product was filtered, washed with water to form a wet cake, and a portion was dried in an oven at 110° C.

A portion of the product wet cake and the dried portion were submitted for X-ray analysis and identified as MCM-56. The X-ray diffraction pattern of the dried MCM-56 is presented below in Table IV.

TABLE IV

| 2 theta | d(A) | I/I$_o$ | Comments$^a$ |
|---|---|---|---|
| 4.1 | 21.6 | 10 | B |
| 6.94 | 12.74 | 34 | B, sh |
| 7.15 | 12.36 | 100 | S |
| 8.9 | 9.9 | 32 | VVB |
| 12.84 | 6.89 | 12 | B |
| 13.89 | 6.38 | 7 | VB, sh |
| 14.32 | 6.18 | 15 | S |
| 15.92 | 5.57 | 8 | VVB |
| 19.94 | 4.45 | 30 | VVB |
| 21.98 | 4.04 | 43 | B |
| 22.51 | 3.95 | 59 | VB |
| 23.44 | 3.80 | 28 | VVB |
| 24.97 | 3.57 | 43 | S |
| 25.93 | 3.44 | 100 | S |
| 26.61 | 3.35 | 51 | B |
| 31.52 | 2.838 | 5 | S |
| 33.40 | 2.683 | 10 | VVB |
| 34.71 | 2.584 | 3 | VVB |
| 36.26 | 2.477 | 3 | S |
| 37.00 | 2.429 | 3 | S |
| 37.75 | 2.383 | 9 | S |

$^a$S = sharp, B = broad, VB = very broad, VVB = very very broad, sh = shoulder

The chemical composition of the product of Example 1 was, in wt. %,

N=1.61

Na=1.1

$Al_2O_3$=6.6

$SiO_2$=70.5

Ash=78.2

The $SiO_2/Al_2O_3$ molar ratio of this product was 18.

EXAMPLE 2

A portion of the product of Example 1 was ammonium exchanged by contacting three times with 1M ammonium nitrate, and then calcined in air for 6 hours at 540° C. The X-ray diffraction pattern of the calcined product of this example proved it to be MCM-56 and is presented below in Table V.

TABLE V

| 2 theta | d(A) | I/I$_o$ | Comments[a] |
|---|---|---|---|
| 4.1 | 21.6 | 37 | B |
| 7.14 | 12.38 | 97 | S |
| 8.9 | 9.9 | 33 | VVB |
| 12.80 | 6.92 | 12 | B |
| 14.42 | 6.14 | 59 | S |
| 15.80 | 5.61 | 14 | VVB |
| 19.76 | 4.49 | 27 | VVB |
| 22.45 | 3.96 | 73 | VVB |
| 23.75 | 3.75 | 26 | VVB |
| 25.10 | 3.55 | 37 | S |
| 26.05 | 3.42 | 100 | S |
| 26.79 | 3.33 | 35 | B |
| 31.75 | 2.818 | 6 | S |
| 33.52 | 2.673 | 10 | VVB |
| 34.82 | 2.576 | 4 | VVB |
| 36.44 | 2.466 | 3 | S |
| 37.96 | 2.370 | 6 | S |

[a]S = sharp, B = broad, VVB = very very broad

EXAMPLE 3

For comparison purposes, Example 1 of U.S. Pat. No. 4,954,325, incorporated herein by reference, was repeated. The as-synthesized crystalline material of the example, referred to herein as MCM-22 precursor or the precursor form of MCM-22, was examined by X-ray diffraction analysis. Its X-ray diffraction pattern is presented in Table VI.

TABLE VI

| 2 theta | d(A) | I/I$_o$ |
|---|---|---|
| 3.1 | 28.5 | 14 |
| 3.9 | 22.7 | <1 |
| 6.53 | 13.53 | 36 |
| 7.14 | 12.38 | 100 |
| 7.94 | 11.13 | 34 |
| 9.67 | 9.15 | 20 |
| 12.85 | 6.89 | 6 |
| 13.26 | 6.68 | 4 |
| 14.36 | 6.17 | 2 |
| 14.70 | 6.03 | 5 |
| 15.85 | 5.59 | 4 |
| 19.00 | 4.67 | 2 |
| 19.85 | 4.47 | 22 |
| 21.56 | 4.12 | 10 |
| 21.94 | 4.05 | 19 |
| 22.53 | 3.95 | 21 |
| 23.59 | 3.77 | 13 |
| 24.98 | 3.56 | 20 |
| 25.98 | 3.43 | 55 |
| 26.56 | 3.36 | 23 |
| 29.15 | 3.06 | 4 |
| 31.58 | 2.833 | 3 |
| 32.34 | 2.768 | 2 |
| 33.48 | 2.676 | 5 |
| 34.87 | 2.573 | 1 |
| 36.34 | 2.472 | 2 |
| 37.18 | 2.418 | 1 |
| 37.82 | 2.379 | 5 |

EXAMPLE 4

The product of Example 3 was calcined at 538° C. for 20 hours. The X-ray diffraction pattern of this calcined product is shown in Table VII.

TABLE VII

| 2 theta | d(A) | I/I$_o$ |
|---|---|---|
| 2.80 | 31.55 | 25 |
| 4.02 | 21.98 | 10 |
| 7.10 | 12.45 | 96 |
| 7.95 | 11.12 | 47 |
| 10.00 | 8.85 | 51 |
| 12.90 | 6.86 | 11 |
| 14.34 | 6.18 | 42 |
| 14.72 | 6.02 | 15 |
| 15.90 | 5.57 | 20 |
| 17.81 | 4.98 | 5 |
| 19.08 | 4.65 | 2 |
| 20.20 | 4.40 | 20 |
| 20.91 | 4.25 | 5 |
| 21.59 | 4.12 | 20 |
| 21.92 | 4.06 | 13 |
| 22.67 | 3.92 | 30 |
| 23.70 | 3.75 | 13 |
| 25.01 | 3.56 | 20 |
| 26.00 | 3.43 | 100 |
| 26.96 | 3.31 | 14 |
| 27.75 | 3.21 | 15 |
| 28.52 | 3.13 | 10 |
| 29.01 | 3.08 | 5 |
| 29.71 | 3.01 | 5 |
| 31.61 | 2.830 | 5 |
| 32.21 | 2.779 | 5 |
| 33.35 | 2.687 | 5 |
| 34.61 | 2.592 | 5 |

EXAMPLE 5

A 2.24 part quantity of 45% sodium aluminate was added to a solution containing 1.0 part of 50% NaOH solution and 43.0 parts H$_2$O in an autoclave. An 8.57 part quantity of Ultrasil precipitated silica was added with agitation, followed by 4.51 parts of HMI.

The reaction mixture had the following composition, in mole ratios:

SiO$_2$/ Al$_2$O$_3$ =23

OH$^-$/SiO$_2$=0.21

Na/SiO$_2$=0.21

HMI/SiO$_2$=0.35

H$_2$O SiO$_2$19.3

The mixture was crystallized at 150° C. for 84 hours with stirring. The product was identified as MCM-49 and had the X-ray pattern which appears in Table VIII. The chemical composition of the product was, in wt. %,

| | |
|---|---|
| N | 1.70 |
| Na | 0.70 |
| Al$_2$O$_3$ | 7.3 |
| SiO$_2$ | 74.5 |
| Ash | 84.2 |

The silica/alumina mole ratio of the product was 17.3.

The sorption capacities, after calcining at 538° C. for 9 hours were, in wt. %,

| | | |
|---|---|---|
| Cyclohexane, 40 Torr | | 10.0 |
| n-Hexane, 40 Torr | | 13.1 |
| H$_2$O, 12 Torr | | 15.4 |

A portion of the sample was calcined in air for 3 hours at 538° C. This material exhibited the X-ray diffraction pattern shown in Table IX.

TABLE VIII

| 2 theta | dm(A) | I/I$_o$ |
|---|---|---|
| 3.1 | 28.5 | 18 |
| 3.9 | 22.8 | 7+ |
| 6.81 | 12.99 | 61 sh |
| 7.04 | 12.55 | 97 |
| 7.89 | 11.21 | 41 |
| 9.80 | 9.03 | 40 |
| 12.76 | 6.94 | 17 |
| 13.42 | 6.60 | 4* |
| 13.92 | 6.36 | 17 |
| 14.22 | 6.23 | 11 |
| 14.63 | 6.05 | 2 |
| 15.81 | 5.61 | 15 |
| 17.71 | 5.01 | 4 |
| 18.86 | 4.71 | 4 |
| 19.23 | 4.62 | 6 |
| 20.09 | 4.42 | 27 |
| 20.93 | 4.24 | 8 |
| 21.44 | 4.14 | 17 |
| 21.74 | 4.09 | 37 |
| 22.16 | 4.01 | 17 |
| 22.56 | 3.94 | 58 |
| 23.53 | 3.78 | 26 |
| 24.83 | 3.59 | 22 |
| 25.08 | 3.55 | 10 |
| 25.86 | 3.45 | 100 |
| 26.80 | 3.33 | 28 |
| 27.53 | 3.24 | 21 |
| 28.33 | 3.15 | 15 |
| 28.98 | 3.08 | 4 |
| 29.47 | 3.03 | 2 |
| 31.46 | 2.843 | 4 |
| 32.08 | 2.790 | 6 |
| 33.19 | 2.699 | 9 |
| 34.05 | 2.633 | 5 |
| 34.77 | 2.580 | 4 |
| 36.21 | 2.481 | 2 |
| 36.90 | 2.436 | 3 |
| 37.68 | 2.387 | 8 | sh = Shoulder
+ = Non-crystallographic MCM-49 peak
* = Impurity peak

TABLE IX

| 2-Theta | d(A) | I/I$_o$ |
|---|---|---|
| 3.2 | 28.0 | 9+ |
| 3.9 | 22.8 | 7+ |
| 6.90 | 12.81 | 48 sh |
| 7.13 | 12.39 | 100 |
| 7.98 | 11.08 | 46 |
| 9.95 | 8.89 | 53 |
| 12.87 | 6.88 | 10 |
| 14.32 | 6.18 | 36 |
| 14.74 | 6.01 | 11 |
| 15.94 | 5.56 | 17 |
| 17.87 | 4.96 | 2 |
| 19.00 | 4.67 | 5 |
| 19.35 | 4.59 | 3 |
| 20.24 | 4.39 | 14 |
| 21.06 | 4.22 | 5 |
| 21.56 | 4.12 | 15 |
| 21.87 | 4.06 | 25 |
| 22.32 | 3.98 | 12 |
| 22.69 | 3.92 | 41 |
| 23.69 | 3.76 | 23 |
| 24.95 | 3.57 | 19 |
| 25.22 | 3.53 | 4 |
| 25.99 | 3.43 | 90 |
| 26.94 | 3.31 | 20 |
| 27.73 | 3.22 | 17 |
| 28.55 | 3.13 | 11 |
| 29.11 | 3.07 | 3 |
| 29.63 | 3.01 | 2 |
| 31.59 | 2.833 | 6 |
| 32.23 | 2.777 | 4 |
| 33.34 | 2.687 | 9 |
| 34.35 | 2.611 | 4 |
| 34.92 | 2.570 | 3 |
| 36.35 | 2.471 | 2 |
| 37.07 | 2.425 | 2 |
| 37.82 | 2.379 | 6 | sh = Shoulder
+ = Non-crystallographic MCM-49 peak

EXAMPLE 6

The product of Example 2 was subjected to the Alpha Test which indicated an Alpha value of 106.

EXAMPLE 7

To compare microporosity and effective pore openings between MCM-56, MCM-22, and MCM-49, hydrocarbon compounds with increasing molecular dimensions were adsorbed sequentially onto portions of calcined MCM-56, MCM-22, and MCM-49 products of the examples according to the procedure described by E. L. Wu, G. R. Landolt, and A. W. Chester in "New Developments in Zeolite Science and Technology", *Studies in Surface Science and Catalysis*, 28, 547 (1986), incorporated herein by reference as to this procedure. The dynamic sorption results of this investigation are presented in Table X below.

TABLE X

| | MCM-56 | | MCM-22 | | MCM-49 | |
|---|---|---|---|---|---|---|
| Sorbate | μl/g | sec. | μl/g | sec. | μl/g | sec. |
| n-Hexane | 79 | 17 | 120 | 12 | 114 | 10 |
| 2,2-Dimethyl-butane | 60 | 12 | 72 | 252 | 85 | 233 |
| 1,3,5-Trimethyl-benzene | 41 | 24 | 8 | 550 | undetectable | |

The sorption results indicate clear distinction between the tested materials. MCM-56 has at least 4 times the capacity of MCM-22 and MCM-49 for 1,3,5-trimethylbenzene, the most hindered hydrocarbon molecule used in this investigation. MCM-56 also demonstrates a much faster initial rate of sorption of 2,2-dimethylbutane (time required to sorb the first 15 mg of 2,2,-dimethylbutane/g of the sorbent at 80 Torr 2,2-dimethyl- butane in flowing helium at 373° K.) than MCM-22 or MCM-49. The corresponding times for representative MCM-56, MCM-22, and MCM-49 materials were 12, 252, and 233 seconds, respectively. The initial rate of sorption of n-hexane is the time required to sorb the first 40 mg n-hexane/g of sorbent and for 1,3,5-trimethyl-benzene, the time required to sorb the first 7 mg of 1,3,5-trimethylbenzene/g of sorbent.

EXAMPLE 8

Example 1 was repeated, except that the reaction was stopped at 40 hours. X-ray analysis proved the product to be MCM-56.

EXAMPLE 9

A mixture of 258 grams of water, 20.5 grams of sodium aluminate solution (25.5% $Al_2O_3$ and 19.5% $Na_2O$), 51.4 grams of Ultrasil (VN3), and 50 grams of hexamethyleneimine (HMI) was reacted in a 600 ml stirred (400 rpm) autoclave at 154° C.

The reaction mixture had the following composition in mole ratios:

$SiO_2/Al_2O_3$=15
$OH^-/SiO_2$=0.17
$Na/SiO_2$=0.17
$HMI/SiO_2$=0.66
$H_2O\ SiO_2$=19

The reaction was stopped at 130 hours. The product was filtered, washed with water to form a wet cake, and a portion was dried in an oven for 2 hours at 110° C.

A portion of the product wet cake and the dried portion were submitted for X-ray analysis and identified as MCM-56. The X-ray diffraction pattern of the dried material is presented below in Table XI.

TABLE XI

| 2 theta | d(A) | I/I$_o$ | Comments[a] |
|---|---|---|---|
| 4.1 | 21.6 | 30 | B |
| 6.67 | 13.25 | 23 | B, sh[b] |
| 6.96 | 12.70 | 24 | B |
| 7.16 | 12.35 | 80 | S |
| 8.9 | 9.9 | 21 | VVB |
| 12.86 | 6.88 | 14 | B |
| 13.98 | 6.33 | 7 | VB, sh |
| 14.33 | 6.18 | 15 | S |
| 15.85 | 5.59 | 7 | VVB |
| 19.93 | 4.45 | 25 | VVB |
| 21.95 | 4.05 | 42 | VB |
| 22.56 | 3.94 | 38 | B |
| 23.46 | 3.79 | 26 | VVB |
| 24.94 | 3.57 | 39 | S |
| 25.94 | 3.43 | 100 | S |
| 26.64 | 3.35 | 33 | B |

[a]S = sharp, B = broad, VB = very broad, VVB = very very broad, sh = shoulder
[b]Possible trace of MCM-22 precursor The chemical composition of the product of Example 9 was, in wt. %, N=1.42
Na=2.3
$Al_2O_3$=9.3
$SiO_2$=70.7
Ash=82.3

The $SiO_2/Al_2O_3$ molar ratio of this product was 13.

EXAMPLE 10

A portion of the dried sample from Example 9 was subjected to a three-fold exchange with a 1 M ammonium nitrate solution. The solid was then heated in nitrogen at 482° C. for 3 hours, cooled to about 130° C., and then calcined in air at 538° C. for 5 hours. This material exhibited the X-ray diffraction pattern shown in Table XII.

TABLE XII

| 2 theta | d(A) | I/I$_o$ | Comments[a] |
|---|---|---|---|
| 4.3 | 20.5 | 69 | B |
| 7.13 | 12.40 | 100 | S |
| 8.1 | 10.9 | 33 | WB |
| 9.8 | 9.0 | 37 | VVB |
| 12.79 | 6.92 | 12 | B |
| 14.38 | 6.16 | 48 | S |
| 15.78 | 5.62 | 17 | VVB |
| 19.74 | 4.50 | 24 | VVB |
| 22.45 | 3.96 | 69 | VVB |
| 23.70 | 3.75 | 23 | VVB |
| 25.10 | 3.55 | 36 | S |
| 26.05 | 3.42 | 88 | S |
| 26.86 | 3.32 | 27 | B |
| 31.71 | 2.822 | 5 | S |
| 33.34 | 2.687 | 9 | B |
| 34.30 | 2.614 | 6 | VVB |
| 36.40 | 2.468 | 5 | S |
| 37.92 | 2.373 | 5 | S |

[a]S = sharp, B = broad, VVB = very very broad

Figure 1B:
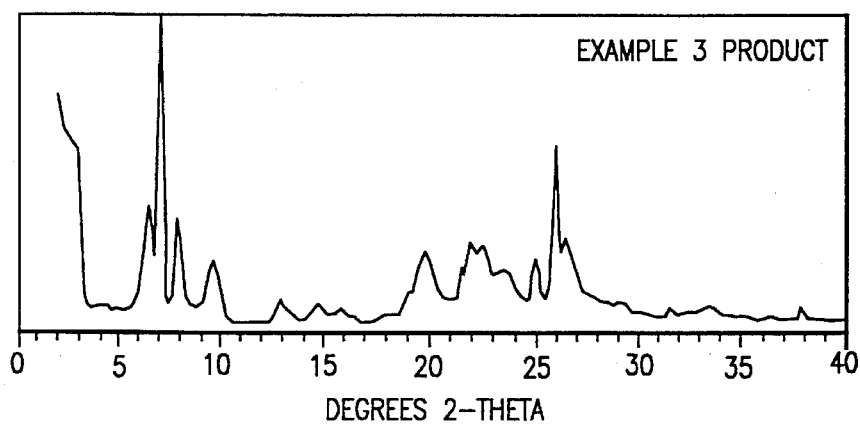
FIG. 1(b) shows the X-ray diffraction pattern of the Example 3 product.
Figure 1C:
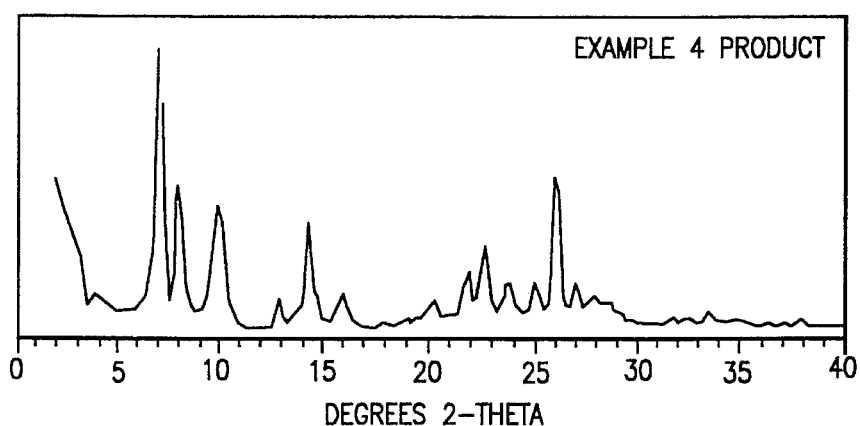
FIG. 1(c) shows the X-ray diffraction pattern of the Example 4 product.
Figure 1D:
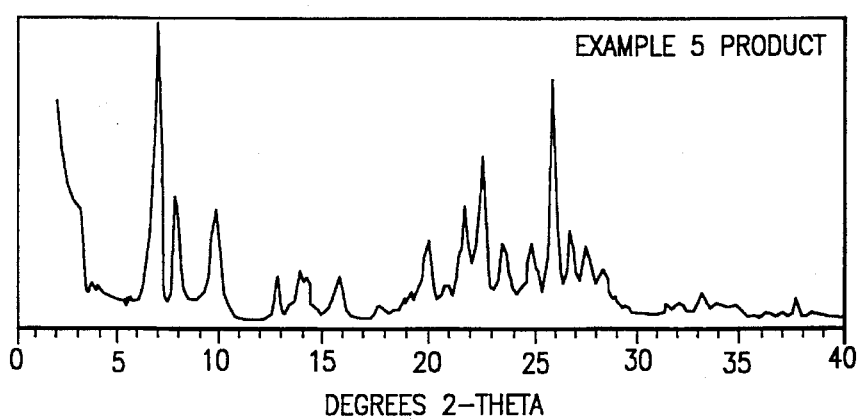
FIG. 1(d) shows the X-ray diffraction pattern of the Example 5 product.

The X-ray diffraction patterns of the product materials from Examples 2–5 are presented in FIG. 1. FIG. 1(a) shows the pattern of the MCM-56 product from Example 2; FIG. 1(b), the pattern of the product from Example 3. The pattern of the MCM-22 product from Example 4 is shown in FIG. 1(c), and the pattern shown in FIG. 1(d) is from the MCM-49 product of Example 5. These patterns are presented in this Figure in a manner by which comparison is facilitated. FIGS. 1(b) and (c) are from the as-synthesized layered material which transforms into crystalline MCM-22 upon calcination, and the crystalline MCM-22, respectively.

EXAMPLE 11

A 2.24 part quantity of 45% sodium aluminate solution was added to a solution containing 1.0 part of 50% NaOH solution and 43.0 parts of $H_2O$ in an autoclave. An 8.57 part quantity of Ultrasil precipitated silica was added with agitation, followed by 4.51 parts of hexamethyleneimine to form a reaction mixture. The reaction mixture had the following composition in mole ratios:

$SiO_2/Al_2O_3$=23
$OH^-/SiO_2$=0.21
$HMI/SiO_2$=0.35
$H_2O\ SiO_2$=19.3

The mixture was crystallized at 149° C. for 27 hours with stirring and the product identified by X-ray diffraction as MCM-56. The chemical composition of the product was, in wt. %:

| Ash @ 1000° C. | 67.3 |
|---|---|
| Na | 2.9 |
| $Al_2O_3$ | 5.7 |
| N | 1.22 | with a silica/alumina mole ratio for the product of 18.1.

The as-synthesized MCM-56 was twice exchanged with 1N ammonium nitrate and then dried at 121° C. The chemical composition of the exchanged product was:

| Ash @ 1000° C. | 84.1 wt. % |
| --- | --- |
| Na | 130 ppm |

EXAMPLE 12

An MCM-56 fluid catalyst was prepared by spray drying an aqueous slurry containing 40 wt. % MCM-56 product from Example 11 in a silica-alumina gel/clay matrix and calcining the spray dried catalyst. The calcination was carried out at 538° C. for 3 hours in air. The Alpha Value of the calcined product catalyst was measured to be 109. The calcined catalyst was then steamed for 10 hours at 788° C. in a 45% steam/55% air mixture at 0 psig. The Alpha Value of the steamed catalyst: was measured to be 6.

The composition of the MCM-56 fluid catalyst after calcination was 40 wt. % MCM-56, 27.3 wt. % silica, 2.7 wt. % alumina, and 30.0 wt. % kaolin clay.

EXAMPLE 13

The base case catalyst to be employed in the present study was an REUSY catalyst removed from a commercial FCC unit following oxidative regeneration. Catalyst properties are summarized in Table XIII.

TABLE XIII

| REUSY, 4 | 11 |
| --- | --- |
| Unit cell size, Angstroms | 24.32 |
| Rare earth, wt. % | 3.0 |
| Silica, wt. % | 54.2 |
| Alumina, wt. % | 34.4 |
| Vanadium, ppm | 1050 |
| Nickel, ppm | 460 |
| Sodium, ppm | 3300 |
| Iron, ppm | 4500 |
| Copper, ppm | 37 |
| Platinum, wt. % | 0.98 |
| Surface area, m$^2$/g | 124 |
| Ash, wt. % | 99.58 |
| Packed density, g/cc | 0.96 |
| Pore volume, cc/g | 0.34 |

EXAMPLE 14

The catalyst product of Example 12 was blended with the catalyst of Example 13 to provide a catalyst product comprising 25 wt. % Example 12 product and 75 wt,.% Example 13 product.

EXAMPLE 15

A phosphorus-containing MCM-56 fluid catalyst was prepared by spray drying an aqueous slurry containing 40 wt. % MCM-56 product from Example 11 in a silica-alumina gel/clay and phosphorus (as phosphoric acid) matrix and calcining the spray dried catalyst. The calcination was carried out at 538° C. for 3 hours in air. The Alpha Value of the calcined product catalyst was measured to be 76. The calcined catalyst was then steamed for 10 hours at 788° C. in a 45% steam/55% air mixture at 0 psig. The Alpha Value of the steamed catalyst was measured to be 3.

The composition of the MCM-56 fluid catalyst after calcination was 40 wt. % MCM-56, 27.3 wt. % silica, 2.7 wt. % alumina, and 30.0 wt. % kaolin clay. The catalyst contained 2.2 wt. % phosphorus.

EXAMPLE 16

The catalyst product of Example 15 was blended with the catalyst of Example 13 to provide a catalyst product comprising 25 wt. % Example 15 product and 75 wt. % Example 13 product.

EXAMPLE 17

The calcined catalyst of Example 12 was exchanged with a rare earth chloride solution followed by calcining the rare earth-exchanged catalyst. The calcination was carried out at 538° C. for 3 hours in air. The calcined catalyst was then steamed for 10 hours at 788° C. in a 45% steam55% air mixture at 0 psig.

The composition of the rare earth-containing MCM-56 fluid catalyst after calcination was 40 wt. % MCM-56, 27.3 wt. % silica, 2.7 wt. % alumina, and 30.0 wt. % kaolin clay. The catalyst contained 0.66 wt. % rare earth oxide.

EXAMPLE 18

The catalyst product of Example 17 was blended with the catalyst of Example 13 to provide a catalyst product comprising 25 wt. % Example 17 product and 75 wt. % Example 13 product.

EXAMPLE 19

The catalysts of Examples 13, 14, 16, and 18 were evaluated in a fixed-fluidized bed (FFB) unit at 515° C. and 1.0 minute catalyst contact time using a Sour Heavy Gas Oil (SHGO) with the properties shown in Table XIV.

TABLE XIV

| Pour point, °F. | 95 |
| --- | --- |
| CCR, wt. % | 0.56 |
| K.V. @ 40° C. | 104.8 |
| K.V. @ 100° C. | 7.95 |
| Aniline point, °F. | 168.5 |
| Bromine number | 6.9 |
| Gravity, API | 20.1 |
| Carbon, wt. % | 85.1 |
| Hydrogen, wt. % | 12.1 |
| Sulfur, wt. % | 2.6 |
| Nitrogen, wt. % | 0.2 |
| Total, wt. % | 100.0 |
| Nickel, ppm | 0.5 |
| Vanadium, ppm | 0.3 |
| Iron, ppm | 1.2 |
| Copper, ppm | <0.1 |
| Sodium, ppm | 0.8 |

A range of conversions was scanned by varying the catalyst/oil ratios. The fixed-fluidized bed (FFB) results (after interpolation at 70 vol.% conversion) are summarized in Table XV.

The results from Table XV show that at a given conversion, the gasoline yield decreases for catalysts comprising MCM-56. However, the gasoline yield loss is accompanied by valuable increases in the i-$C_4$, $C_3$=, and $C_4$= yields which are potential feeds for alkylation, diisopropyl ether, and methyl tert-butyl ether. The gasoline yield loss is more than made up by considering the potential alkylate. Octane measurements increased for the $C_5$+ gasoline.

Additional activity (as measured by gasoline loss) was obtained by the addition of phosphorus to the MCM-56 catalyst. Additional gasoline selectivity was obtained by the addition of rare earth to the MCM-56 catalyst.

TABLE XV

| Catalyst of Example | 13 | 14 | 16 | 18 |
|---|---|---|---|---|
| Conversion, vol. % | 70.0 | 70.0 | 70.0 | 70.0 |
| Conversion, wt. % | 67.2 | 67.2 | 67.3 | 67.0 |
| $C_5+$ gasoline, wt. | 45.9 | 39.4 | 36.4 | 41.2 |
| $C_5+$ gasoline, vol. % | 56.0 | 48.3 | 44.5 | 50.1 |
| Light gas, wt. % | 3.0 | 3.5 | 3.3 | 2.8 |
| Total $C_3$, vol. % | 9.9 | 14.3 | 19.0 | 14.0 |
| Total $C_4$, vol. % | 12.7 | 17.0 | 18.9 | 15.8 |
| Coke, wt. % | 4.90 | 5.77 | 5.19 | 5.34 |
| LFO, wt. % | 25.7 | 26.1 | 25.0 | 25.9 |
| HFO, wt. % | 7.1 | 6.7 | 7.7 | 7.1 |
| G + D, wt. % | 71.6 | 65.5 | 61.5 | 67.1 |
| Alkylate, vol. % | 20.4 | 30.5 | 37.8 | 29.3 |
| Gasoline + Alkylate, vol. % | 76.4 | 78.8 | 82.3 | 79.4 |
| Outside i-$C_4$ for alkylate, vol. % | 7.4 | 13.3 | 16.9 | 11.8 |
| n-$C_5$, vol. % | 0.4 | 0.7 | 0.4 | 0.6 |
| i-$C_5$, vol. % | 5.7 | 5.8 | 6.1 | 6.0 |
| $C_5$=, vol. % | 3.6 | 4.7 | 4.9 | 4.5 |
| n-$C_4$, vol. % | 1.0 | 2.3 | 2.0 | 0.7 |
| n-$C_4$, wt. % | 0.8 | 1.4 | 1.2 | 0.5 |
| i-$C_4$, vol. % | 6.6 | 7.6 | 9.3 | 8.4 |
| i-$C_4$, wt. % | 4.0 | 4.6 | 5.6 | 5.1 |
| $C_4$=, vol. % | 5.2 | 7.1 | 7.6 | 6.7 |
| $C_4$=, wt. % | 3.4 | 4.6 | 4.9 | 4.3 |
| $C_3$, vol. % | 2.7 | 3.0 | 3.7 | 3.0 |
| $C_3$, wt. % | 1.5 | 1.6 | 2.0 | 1.6 |
| $C_3$=, vol. % | 7.1 | 11.3 | 15.3 | 11.0 |
| $C_3$=, wt. % | 4.0 | 6.3 | 8.5 | 6.2 |
| $C_2$, wt. % | 0.7 | 0.8 | 0.7 | 0.7 |
| $C_2$=, wt. % | 0.6 | 0.9 | 1.1 | 0.7 |
| $C_1$, wt. % | 0.7 | 0.7 | 0.6 | 0.6 |
| $H_2$, wt. % | 0.11 | 0.17 | 0.11 | 0.20 |
| $H_2S$, wt. % | 0.86 | 0.89 | 0.85 | 0.64 |
| $C_3$=/$C_3$, mol/mol | 2.7 | 3.8 | 4.2 | 3.7 |
| $C_4$=/$C_4$, mol/mol | 0.7 | 0.7 | 0.7 | 0.7 |
| $C_5$=/$C_5$, mol/mol | 0.6 | 0.7 | 0.8 | 0.7 |
| Crackability | 2.3 | 2.3 | 2.3 | 2.3 |
| Hydrogen factor | 60 | 81 | 55.0 | 117.0 |
| RON, raw gasoline | 90.6 | 92.0 | 93.5 | 92.3 |
| RON, $C_5+$ gasoline | 90.3 | 91.7 | 93.1 | 91.8 |
| RON, $C_5+$ gasoline + alkylate | 91.2 | 92.4 | 93.2 | 92.5 |

We claim:

1. A process for converting a feedstock comprising organic compounds to conversion product which comprises contacting said feedstock at organic compound conversion conditions including a temperature of from about −25° C. to about 650° C. and a pressure of from about atmospheric to about 5000 psig with a catalyst composition comprising an active form of synthetic layered material having a composition comprising the molar relationship $$X_2O_3:(n)YO_2,$$

wherein n is less than about 35, X is a trivalent element selected from the group consisting of aluminum boron, iron, gallium, and combination thereof, and Y is a tetravalent element selected from the group consisting of silicon, germanium, and combination thereof, said material further characterized by a sorption capacity for 1,3,5-trimethylbenzene of at least about 35 µl/gram of calcined synthetic material, an initial uptake of 15 mg of 2,2-dimethylbutane/gram of calcined synthetic material of less than about 20 seconds, and an X-ray diffraction pattern for the calcined synthetic material having d-spacing maxima at 12.4±0.2, 9.9±0.3, 6.9±0.1, 6.2±0.1, 3.55±0.07, and 3.42±0.07 Angstroms.

2. The process of claim 1 wherein n is from about 5 to less than about 25.

3. The process of claim 1 wherein n is from about 10 to about 20.

4. The process of claim 1 wherein X comprises aluminum and Y comprises silicon.

5. The process of claim 2 wherein X comprises aluminum and Y comprises silicon.

6. The process of claim 3 wherein X comprises aluminum and Y comprises silicon.

7. The process of claim 1 wherein said catalyst composition comprises a matrix selected from the group consisting of alumina, silica, zirconia, titania, magnesia, beryllia, and a combination thereof.

8. The process of claim 1 wherein said feedstock comprises aromatic compounds and olefins of six or more carbon atoms, conversion product comprises the product of alkylation, and said conversion conditions include a temperature of from about 340° C. to about 500° C., a pressure of from about atmospheric to about 200 atmospheres, a weight hourly space velocity of from about 2 hr$^{-1}$ to about 2000 hr$^{-1}$, and an aromatic compound/olefin mole ratio of from about 1/1 to about 20/1.

9. The process of claim 1 wherein said feedstock comprises reformate and fuel gas, conversion product comprises mono- and dialkylates, and said conversion conditions include a temperature of from about 315° C. to about 455° C. and a pressure of from about 400 psig to about 800 psig.

10. The process of claim 1 wherein said feedstock comprises aromatic compounds selected from the group consisting of benzene, toluene, xylene, and naphthalene, and olefins of six or more carbon atoms, conversion product comprises alkylated aromatic lube base stock, and said conversion conditions include a temperature of from about 160° C. to about 260° C. and a pressure of from about 350 psig to about 450 psig.

11. The process of claim 1 wherein said feedstock comprises phenols and alkylating agent of 6 to 14 carbon atoms, conversion product comprises alkyl phenol, and said conversion conditions include a temperature of from about 200° C. to about 250° C., a pressure of from about 200 psig to about 300 psig, and a weight hourly space velocity of from about 2 hr$^{-1}$ to about 10 hr$^{-1}$.

12. The process of claim 1 wherein said feedstock comprises isoalkanes and olefins, conversion product comprises the product of alkylation, and said conversion conditions include a temperature of from about −25° C. to about 400° C., a pressure of from below atmospheric to about 5000 psig, a weight hourly space velocity of from about 0.01 hr$^{-1}$ to about 100 hr$^{-1}$, and a mole ratio of total isoalkanes/total olefins of from about 1/2 to about 100/1.

13. The process of claim 12 wherein said isoalkanes comprise isobutane and said olefins comprise 2-butene.

14. A process for converting feedstock hydrocarbon compounds to product hydrocarbon compounds having a lower molecular weight than the feedstock hydrocarbon compounds which comprises contacting said feedstock at conversion conditions with a catalyst composition comprising an active form of synthetic layered material having a composition comprising the molar relationship $$X_2O_3:(n)YO_2,$$

wherein n is less than about 35, X is a trivalent element selected from the group consisting of aluminum, boron, iron, gallium, and combination thereof, and Y is a tetravalent element selected from the group consisting of silicon, germanium, and combination thereof, said material further characterized by a sorption capacity for 1,3,5-trimethylbenzene of at least about 35 µl/gram of calcined synthetic material, an initial uptake of 15 mg of 2,2-dimethylbutane/gram of calcined synthetic material of less than about 20 seconds, and an X-ray diffraction pattern for the calcined synthetic material having d-spacing maxima at 12.4±0.2, 9.9±0.3, 6.9±0.1, 6.2±0.1, 3.55±0.07, and 3.42±0.07 Angstroms.

15. The process of claim 14 where n is from about 5 to less than about 25.

16. The process of claim 14 wherein n is from about 10 to about 20.

17. The process of claim 14 wherein X comprises aluminum and Y comprises silicon.

18. The process of claim 15 wherein X comprises aluminum and Y comprises silicon.

19. The process of claim 16 wherein X comprises aluminum and Y comprises silicon.

20. The process of claim 14 wherein said catalyst composition comprises a matrix selected from the group consisting of alumina, silica, zirconia, titania, magnesia, beryllia, and a combination thereof.

21. The process of claim 14 wherein said conversion conditions include temperature of from about 400° C. to about 650° C. and a pressure of from atmospheric to about 5 atmospheres.

22. The process of claim 14 wherein said conversion conditions include an average reactor temperature of from about 450° C. to about 540° C., a catalyst/feedstock volume ratio of from about 2 to about 7, and a space volume hourly velocity of from about 1 to about 5 $hr^{-1}$.

23. The process of claim 14 wherein said conversion conditions include a riser top temperature of from about 500° C. to about 595° C., a catalyst/feedstock volume ratio of from about 3 to about 12, and a catalyst residence time of from about 0.5 to about 15 seconds.

24. The process of claim 14 wherein said catalyst composition further comprises a molecular sieve material having pore openings of greater than about 7 Angstroms, said molecular sieve material being selected from the group consisting of zeolites REY, USY, REUSY, dealuminated Y, ultrahydrophobic Y, silicon-enriched dealuminated Y, ZSM-20, Beta, L, silicoaluminophosphates SAPO-5, SAPO-37, SAPO-40, MCM-9, metalloaluminophosphate MAPO-36, aluminophosphate VPI-5, and mesoporous crystalline MCM-41.

25. The process of claim 24 wherein the molecular sieve material comprises REY, USY, or REUSY.

26. The process of claim 24 wherein said catalyst composition further comprises phosphorus.

27. The process of claim 14 wherein said feedstock comprises a gas oil having an initial boiling point above about 204° C. and an end point of at least about 315° C.

28. The process of claim 14 wherein said feedstock comprises deep cut gas oil, vacuum gas oil, thermal oil, residual oil, cycle stock, whole top crude, tar sand oil, shale oil, or a product of hydrotreatment thereof.

29. The process of claim 14 wherein said catalyst composition further comprises from about 0.01 ppm to about 100 ppm by weight of an oxidation promoter selected from the group consisting of platinum, palladium, iridium, osmium, rhodium, ruthenium, rhenium, and combination thereof.

30. A process for cracking feedstock hydrocarbon compounds to product comprising gasoline and olefins of 3 to 4 carbon atoms which comprises contacting said feedstock at cracking conditions including a temperature of from about 400° C. to about 650° C. with a catalyst composition comprising an active form of synthetic layered material having a composition comprising the molar relationship $$X_2O_3:(n)YO_2,$$

wherein n is less than about 35, X is a trivalent element selected from the group consisting of aluminum, boron, iron, gallium, and combination thereof, and Y is a tetravalent element selected from the group consisting of silicon, germanium, and combination thereof, said material further characterized by a sorption capacity for 1,3,5-trimethylbenzene of at least about 35 μl/gram of calcined synthetic material, an initial uptake of 15 mg of 2,2-dimethylbutane/gram of calcined synthetic material of less than about 20 seconds, and an X-ray diffraction pattern for the calcined synthetic material having d-spacing maxima at 12.4±0.2, 9.9±0.3, 6.9±0.1, 6.2±0.1, 3.55±0.07, and 3.42±0.07 Angstroms.

31. The process of claim 30 wherein said catalyst composition further comprises a molecular sieve material having pore openings of greater than about 7 Angstroms, said molecular sieve material being selected from the group consisting of zeolites REY, USY, REUSY, dealuminated Y, ultrahydrophobic Y, silicon-enriched dealuminated Y, ZSM-20, Beta, L, silicoaluminophosphates SAPO-5, SAPO-37, SAPO-40, MCM-9, metalloaluminophosphate MAPO-36, aluminophosphate VPI-5, and mesoporous crystalline MCM-41.

32. The process of claim 31 wherein said catalyst composition further comprises phosphorus.

33. The process of claim 31 wherein the molecular sieve material comprises REY, USY, or REUSY.

34. The process of claim 30 wherein said feedstock comprises a gas oil having an initial boiling point above about 204° C. and an end point of at least about 315° C.

35. The process of claim 30 wherein said feedstock comprises deep cut gas oil, vacuum gas oil, thermal oil, residual oil, cycle stock, whole top crude, tar sand oil, shale oil, or a product of hydrotreatment thereof.

36. The process of claim 30 wherein said catalyst composition further comprises from about 0.01 ppm to about 100 ppm by weight of an oxidation promoter selected from the group consisting of platinum, palladium, iridium, osmium, rhodium, ruthenium, rhenium, and combination thereof.

37. A process for separating at least one hydrocarbon component from a mixture of components comprising said at least one hydrocarbon compound in the vapor or liquid phase having differential sorption characteristics with respect to a sorbent comprising a synthetic layered material having a composition comprising the molar relationship $$X_2O_3:(n)YO_2,$$

wherein n is less than about 35, X is a trivalent element selected from the group consisting of aluminum, boron, iron, gallium, and combination thereof, and Y is a tetravalent element selected from the group consisting of silicon, germanium, and combination thereof, said material further characterized by a sorption capacity for 1,3,5-trimethylbenzene of at least about 35 μl/gram of calcined synthetic material, an initial uptake of 15 mg of 2,2-dimethylbutane/gram of calcined synthetic material of less than about 20 seconds, and an X-ray diffraction pattern for the calcined synthetic material having d-spacing maxima at 12.4±0.2, 9.9±0.3, 6.9±0.1, 6.2±0.1, 3.55±0.07, and 3.42±0.07 Angstroms, said process comprising contacting the mixture containing said components with said sorbent to selectively sorb from the mixture and onto said sorbent said at least one hydrocarbon component of the mixture, so as to effect a selective separation of said at least one sorbed hydrocarbon component from the remaining at least one unsorbed component of the mixture.

38. The process of claim 37 in which the mixture comprises at least two hydrocarbon components, at least one of which is selectively sorbed on said sorbent in preference to at least one other hydrocarbon component of the mixture.

39. The process of claim 37 in which the mixture comprises an alcohol and at least one hydrocarbon component, at least one hydrocarbon component of the mixture being selectively sorbed on said sorbent in preference to the alcohol in the mixture.

40. A process for sorbing a hydrocarbon compound in the vapor or liquid phase comprising contacting said hydrocarbon compound with a sorbent comprising a synthetic layered material having a composition comprising the molar relationship $$X_2O_3:(n)YO_2,$$

wherein n is less than about 35, X is a trivalent element selected from the group consisting of aluminum, boron, iron, gallium, and combination thereof, and Y is a tetravalent element selected from the group consisting of silicon, germanium, and combination thereof, said material further characterized by a sorption capacity for 1,3,5-trimethylbenzene of at least about 35 µl/gram of calcined synthetic material, an initial uptake of 15 mg of 2,2-dimethylbutane/gram of calcined synthetic material of less than about 20 seconds, and an X-ray diffraction pattern for the calcined synthetic material having d-spacing maxima at 12.4±0.2, 9.9±0.3, 6.9±0.1, 6.2±0.1, 3.55±0.07, and 3.42±0.07 Angstroms.

* * * * *